United States Patent Office 2,722,380
Patented Nov. 1, 1955

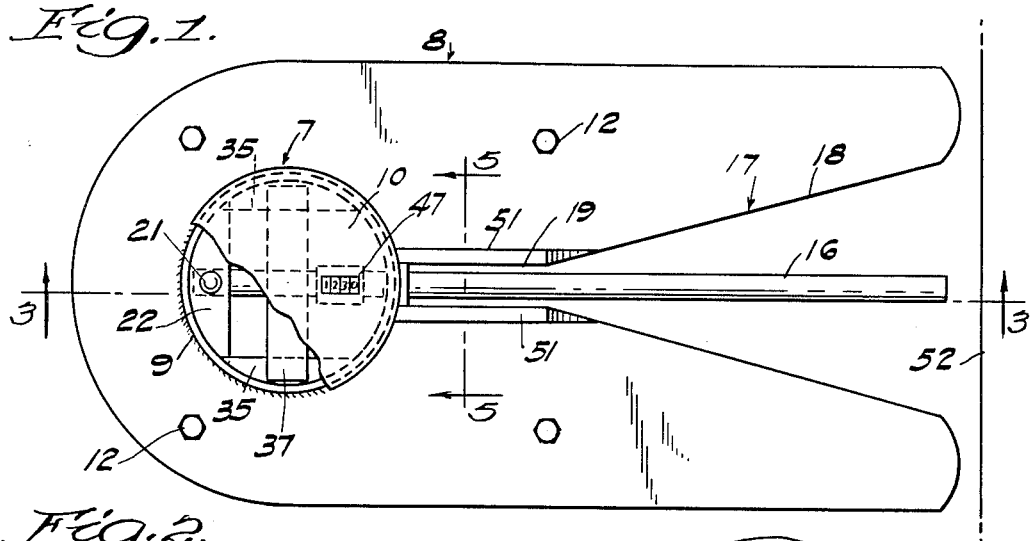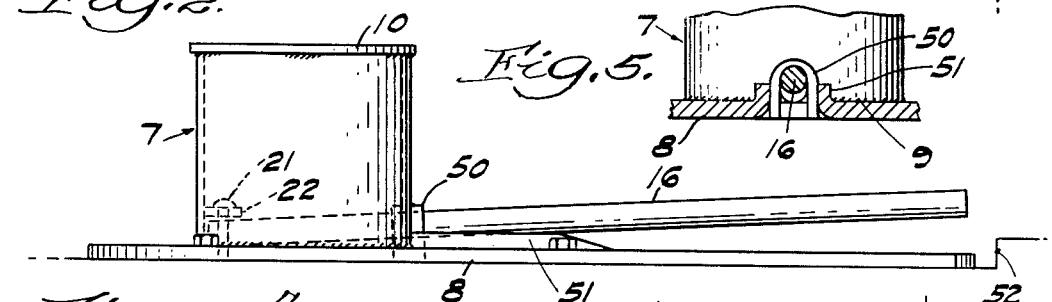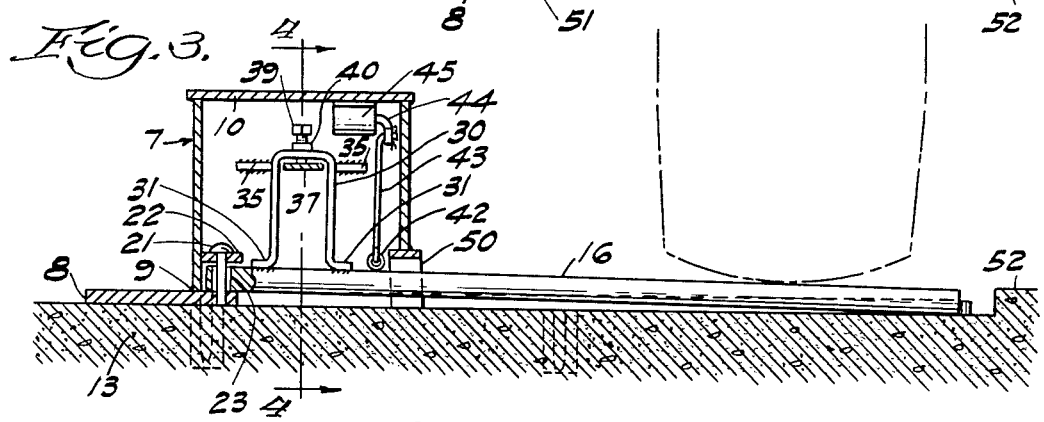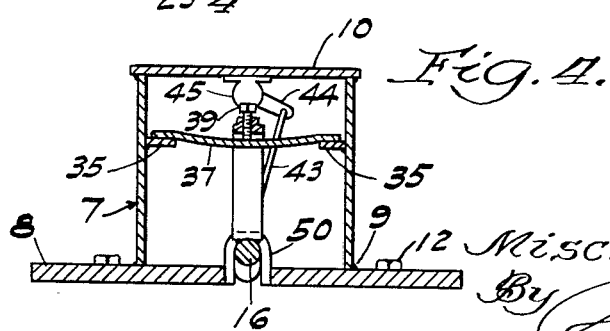

2,722,380

VEHICLE WHEEL OPERATED COUNTER

Mischa N. Berezny, Huntington Park, Calif.

Application November 28, 1952, Serial No. 323,051

10 Claims. (Cl. 235—99)

This invention relates to a vehicle wheel operated counter.

I have invented other car counting devices which have been primarily directed to accurately counting cars, in which devices special means are provided to guard against deceptive counting, such devices not being as inexpensive to manufacture and install as the present invention. But the extremely simple device of the present invention has been provided to count cars under circumstances wherein there is no danger of deception in regard to the count being attempted; as, for example, on a congested street corner of a city, regarding which location the city authorities are desirous of ascertaining the number of cars passing.

Another object of the invention is to provide improved means for mounting and guiding the movements of a vehicle wheel operated treadle arm which is operatively connected with a counter.

A more specific object of the invention is to provide, for a device of the kind described, an improved base plate which can be secured to a roadbed, said base plate being recessed or cut out in such a manner as to lighten it and lower cost of manufacture and at the same time so as to unobstruct the operation of a vehicle wheel operated treadle arm associated therewith.

Other objects, advantages and features of invention will hereinafter appear.

Referring to the accompanying drawing, which illustrates a preferred embodiment of the invention, Fig. 1 is a plan view of the device, an upper part of the casing being broken away to disclose underlying structure.

Fig. 2 is a side elevation of the device viewed in its normal position.

Fig. 3 is a longitudinal, approximate midsection taken on line 3—3 of Fig. 1, showing the device in the vehicle wheel operated position, the vehicle wheel being fragmentarily outlined by a broken line. In this view the upper part of a roadbed to which the device is anchored is shown in section.

Fig. 4 is a transverse section on line 4—4 of Fig. 3, the roadbed being omitted.

Fig. 5 is a fragmentary transverse section taken on line 5—5 of Fig. 1.

Referring in detail to the drawing, the vehicle wheel counter therein shown comprises a drum shaped, desirably sheet metal casing 7 which upstands from one end portion of an elongated base plate 8. Said base plate is shown circularly arcuated at one end, said circular casing being concentrically positioned in relation to said arcuate casing part and being welded thereto by a circular weld 9. Said casing is shown having a circular cover 10 welded thereto.

Four screw bolts 12 are shown, which pass through bolt holes in said base plate 8 and anchor it to the roadbed 13 which may be the cement floor of a public garage or car washing establishment.

The device is shown provided with a vehicle wheel operable treadle arm 16 mounted in a superjacent relation to the aforesaid roadbed 13 to be swung by vehicle wheels passing thereover down to an overlying, contacting relation to said roadbed. In order to allow the free end of said arm to engage the roadbed, said base plate 8 is bifurcated by being provided in one end with a deep recess or cut-out 17 having a triangularly widened outer end portion 18 and a narrow throat or inner end portion 19, said throat extending diametrically under the greater part of the basal portion of said casing 7. Opposite the inner end of said recess 17 a vertical pin 21 is mounted between a casing carried bracket 22 and the underlying part of the base plate 8, and this pin passes very loosely through an aperture 23 provided for it in the inner end portion of the aforesaid treadle arm 16, thus assisting in keeping said arm in place while holding its inner extremity against material vertical movement. The triangularly widened part 18 of the cut-out safeguards against the cut-out becoming clogged and facilitates using a stream of water from a hose to clean out the throat portion 19 of the cut-out.

In a secured, upstanding relation to the part of the arm 16 which is within the casing 9 is a member 30, shaped as an inverted stirrup, the outwardly directed end portions 31 of this member being welded or otherwise secured to the treadle arm 16 at two spaced apart places along the length thereof.

Two diametrically opposite brackets or shelves 35 are interiorly welded to the casing 7 about on a level with the upper part of the stirrup shaped member 30, and a spring forming strip of resilient metal 37 is supported at its ends by said shelves and bridges the space between them, the midlength portion of this spring being subjacent to the cross run or basal part of the stirrup shaped member 30. An adjusting screw 39 provided with a locking nut 40 is in a screw-threaded relation to the basal or midlength part of said member 30, the lower end of said screw adjustably engaging the midwidth portion of the upper side of the spring 37 to regulate the tension of said spring.

Within the casing 7, close to its front side (the right side thereof as viewed in Figs. 1, 2 and 3), the treadle arm 16 has secured to it an eye 42 onto which is hooked the lower end of a link 43, the upper end of said link being attached to the operating crank 44 of a conventional counter 45. Said counter is welded to the under side of said cover and the cover is provided with a sight opening 47 (see Fig. 1), through which the number recorded on said counter is observable.

The cylindrical treadle arm 16 is guided in its swinging movements by a metal strap 50 which is of an inverted U-shape and is welded in place within an opening into which it is fitted in the lower part of the front side of the casing. The upper part of said strap 50 forms a stop which arrests the upswing of the arm 16 after it has been upswung the proper distance by the leaf spring 37. The throat portion 19 of the cut-out part of the base plate 8 is shown bordered with stiffening flanges 51.

A ramp 52 about four inches high is secured to the roadbed, said ramp extending at a right angle to the treadle arm 16 and sufficiently near thereto to insure that the wheels on the adjacent side of passing vehicles will necessarily engage and depress said treadle arm.

The recessed end portion of the base plate 8 extends out a little farther than the outer end of the treadle arm 16, hence passing car wheels travel over the bifurcation of said plate when they depress said arm. But the spacious cut-out 17 in the base plate provides a wide clearance at each side of the outer end portion of said arm 16 so that the tread portion of each passing wheel efficiently operates said treadle arm. The base plate is shown having a thickness less than the diameter of said treadle arm.

The operation of the counter by the device will be readily understood from the foregoing description thereof. It is to be observed that, each time a four wheeled vehicle passes the device the two wheels adjacent thereto will both operate the treadle arm 16 causing it to swing in a vertical plane which extends transversely of the roadbed. Therefore, at the close of each business day the number registered by the counter will be double that of the number of cars that have passed the device, and, therefore, said number must be divided by two to obtain the correct record.

I claim:

1. A vehicle wheel operated counter comprising a casing having a lower portion with an opening in one side thereof, a treadle arm operatively connected with a counter and mounted superjacent to a roadbed to swing vertically to and from an overlying relation to said roadbed, said arm having an end portion within said casing anchored to the side portion thereof opposite to said opening, means within said casing swingably holding said arm in place to swing vertically within said opening in a vertical plane which extends transversely of the roadbed, a spring carried by said casing at a point spaced considerably above the part of said arm therein, and an upstanding member carried by said arm within said casing and operatively connecting said arm with said spring so that the latter normally maintains a free end portion of the arm at an upward inclination, said spring restoring the arm to its normal position after it has been depressed by a vehicle wheel passing thereover.

2. A spring construction for restoring a treadle after depression comprising a casing, means within said casing holding said treadle in place to swing in a vertical plane extending transversely of the roadbed, a spring carried by said casing at a point spaced considerably above the part of said treadle therein, and an upstanding member carried by said treadle within said casing and operatively connecting the latter with said spring, said upstanding member being of an inverted stirrup shape with the ends of its arms secured to said treadle at two spaced apart points along the length of the latter.

3. The subject matter of claim 2 and said spring being a metal strip with a midlength portion underlying said stirrup and end portions supported by opposite side portions of said casing.

4. In a vehicle wheel operated counter, an elongated base plate anchored to a roadbed, said plate having a cut-out extending into it from one end along its midwidth for the greater part of its length, a casing secured to said base plate and upstanding from the opposite end of said plate and in an overlying relation to the inner end portion of said cut-out, a vehicle wheel operable treadle arm guided in its swinging by said casing so as to swing in a vertical plane extending transversely of the roadbed and having an attached end portion connected with said casing, spring means operatively connected with said treadle arm and normally maintaining it upswung, said treadle arm being depressible by vehicle wheels passing thereover into contact with the portion of said roadbed within said cut-out part of said base plate, and means operatively connecting said treadle arm with a counter.

5. The subject matter of claim 4 and the outer end portion of said cut-out part of said base plate being traversed by the vehicle wheels which depress said treadle arm, said cut-out widening toward its outer end so as to afford a wide clearance at each side of the part of said treadle arm which is engaged by the vehicle wheels which pass thereover.

6. The subject matter of claim 4 and said casing being an upstanding wall portion with a basal opening through it to provide an operating clearance for said treadle arm, and a guide member for said arm of an inverted U shape occupying said opening and having side portions which guide the vertical swinging of said treadle arm, said treadle arm being swingably anchored within said casing at a point considerably spaced away from said opening, so that said arm swings in a vertical plane extending transversely of the roadbed.

7. The subject matter of claim 6 and said guide member having an upper end portion which forms a stop which limits the upswing of said arm.

8. A vehicle wheel operated counter comprising a casing stationed alongside a roadbed and having an opening in the side thereof adjacent to said roadbed, a treadle arm operatively connected with a counter, said arm extending through said opening and having one of its end portions swingably anchored to said casing at a point considerably spaced away from said opening thus mounting the arm to swing in a vertical plane which extends transversely of the roadbed, a member shaped as an inverted stirrup having its lower ends secured to said arm at points spaced apart along the length of the latter within the space between said opening and said anchored end portion, of the arm, a substantially horizontal leaf spring having end portions supported at opposite sides of said casing and a midlength portion between the limbs of said stirrup shaped member and pressing upwardly in relation to the midlength portion thereof, thus tending to restore the treadle arm, after it has been depressed by a vehicle wheel passing over it, to its normal position wherein its free end is upwardly inclined.

9. The structure set forth in claim 8 and an adjusting screw in a screwthreaded relation to the midlength part of said stirrup shaped member, said screw having a downwardly directed end portion engaging the midwidth portion of said leaf spring to regulate the tension of said spring.

10. A vehicle wheel operated counter comprising a casing, having a lower portion with an opening in one side thereof, a treadle arm operatively connected with a counter and mounted superjacent to a roadbed to swing in a vertical plane extending transversely of the roadbed to and from an overlying relation to said roadbed, said arm having an end portion within said casing anchored to the side portion thereof opposite said opening, a guide member for said arm comprising a metal strap shaped as an inverted U fitted within said opening, a member shaped as an inverted stirrup having its lower ends secured to said arm at points spaced apart along the length of the latter within the space between said opening and said anchored end portion of said arm, and a substantially horizontal tension spring with end portions supported at opposite sides of said casing and a midlength portion between the limbs of said stirrup shaped member and pressing upwardly in relation to the midlength portion thereof, thus tending to restore the treadle arm to its normal position after it has been depressed by a vehicle wheel passing thereover.

References Cited in the file of this patent

UNITED STATES PATENTS

| | | |
|---|---|---|
| 2,077,767 | Morse | Apr. 20, 1937 |
| 2,081,245 | McLean et al. | May 25, 1937 |
| 2,097,861 | Mackay et al | Nov. 2, 1937 |

FOREIGN PATENTS

| | | |
|---|---|---|
| 17,207 | Australia | Dec. 4, 1929 |